United States Patent
Fujita et al.

(10) Patent No.: US 7,870,924 B2
(45) Date of Patent: Jan. 18, 2011

(54) ARRANGEMENT STRUCTURE OF A REAR MASTER CYLINDER AND A HYDRAULIC FLUID RESERVOIR TANK IN A SADDLE-RIDING TYPE VEHICLE, AND MOTORCYCLE INCORPORATING SAME

(75) Inventors: Masayuki Fujita, Saitama (JP); Yuzuru Ishikawa, Saitama (JP); Shinichi Kuwahara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 240 days.

(21) Appl. No.: 12/228,601

(22) Filed: Aug. 14, 2008

(65) Prior Publication Data

US 2009/0058030 A1 Mar. 5, 2009

(30) Foreign Application Priority Data

Aug. 30, 2007 (JP) .............................. 2007-224697

(51) Int. Cl.
*B62K 11/02* (2006.01)
(52) U.S. Cl. ................... 180/227; 180/219; 280/284; 280/285
(58) Field of Classification Search .......... 180/219, 180/227; 280/284, 285
See application file for complete search history.

(56) References Cited

U.S. PATENT DOCUMENTS

| 4,572,317 | A | * | 2/1986 | Isono et al. | ................ 180/227 |
|---|---|---|---|---|---|
| 4,702,339 | A | * | 10/1987 | Hayashi et al. | ............. 180/219 |
| 6,779,620 | B2 | * | 8/2004 | Taniguchi et al. | ........... 180/219 |
| 6,789,638 | B2 | * | 9/2004 | Miyashiro | .................... 180/227 |
| 7,547,030 | B2 | * | 6/2009 | Toyoda et al. | ............... 280/286 |
| 7,708,098 | B2 | * | 5/2010 | Toyoda | ....................... 180/219 |

FOREIGN PATENT DOCUMENTS

| JP | S52-166252 U | 12/1977 |
|---|---|---|
| JP | S55-009749 U | 1/1980 |
| JP | S55-32272 U | 3/1980 |
| JP | 59-134078 A | 8/1984 |
| JP | 11-301566 | 11/1999 |
| JP | 2002-178906 | 6/2002 |
| JP | 2002-200996 | 7/2002 |

* cited by examiner

*Primary Examiner*—Lesley Morris
*Assistant Examiner*—Michael R Stabley
(74) *Attorney, Agent, or Firm*—Carrier Blackman & Associates, P.C.; William D. Blackman; Joseph P. Carrier

(57) ABSTRACT

A saddle-riding type vehicle includes a vehicle body, a pivot frame that supports a swing arm for rear wheel suspension, and a rear master cylinder disposed rearwardly of the pivot frame. A reservoir tank supplies hydraulic fluid to the rear master cylinder, and the reservoir tank is disposed between the pivot frame and the rear master cylinder. A portion of the swing arm, adjacent to the reservoir tank, is configured with a concave recess formed therein extending inwardly towards a longitudinal center line of the vehicle body. The reservoir tank is situated closer to a vehicle body inner side, and is deeper in the recess than the rear master cylinder.

18 Claims, 6 Drawing Sheets

ARRANGEMENT STRUCTURE OF A REAR MASTER CYLINDER AND A HYDRAULIC FLUID RESERVOIR TANK IN A SADDLE-RIDING TYPE VEHICLE, AND MOTORCYCLE INCORPORATING SAME

CROSS-REFERENCE TO RELATED APPLICATIONS

The present application claims priority under 35 USC §119 based on Japanese patent application No. 2007-224697, filed on Aug. 30, 2007. The entire subject matter of this priority document is incorporated by reference herein.

BACKGROUND OF THE INVENTION

1. Field of the Invention

The present invention relates to a saddle-riding type vehicle, such as a motorcycle, having a rear master cylinder disposed at a rear of a pivot frame supporting a swing arm for a rear wheel suspension. More particularly, the present invention relates to an arrangement of a rear master cylinder and a reservoir tank in saddle-riding type vehicle.

2. Description of the Background Art

There are several known saddle-riding type vehicles in which a reservoir tank that supplies hydraulic fluid to a rear master cylinder is integrally disposed at a rear of the rear master cylinder or disposed at rear and above the rear master cylinder and is spaced therefrom.

Examples of such known saddle-riding type vehicles are disclosed in the Japanese Patent Applications Nos. 2002-178906, 2002-200996 and Hei 11-301566.

In the conventional arrangements, the disposition of the reservoir tank at the rear of the rear master cylinder causes undesirable influence on the reservoir tank due whirling up from a road surface or the like during vehicle operation. Therefore, it is desirable to minimize such undesirable influence on the reservoir tank due to whirling up from a road surface during operation of the vehicle.

The present invention has been made to overcome such drawbacks. Accordingly, it is one of the objects of the present invention to provide arrangement of a reservoir tank in the saddle-riding type vehicle to efficiently suppress an influence of disturbance to a reservoir tank operatively connected with a rear master cylinder in a saddle-riding type vehicle having the rear master cylinder at a rear of a pivot frame supporting a swing arm for a rear wheel suspension.

SUMMARY OF THE INVENTION

In order to achieve the above objects, the present invention according to a first aspect thereof provides a saddle-riding type vehicle having a rear master cylinder at a rear of a pivot frame that supports a swing arm for rear wheel suspension includes a reservoir tank that supplies hydraulic fluid to the rear master cylinder. The reservoir tank is disposed between the pivot frame and the rear master cylinder.

The present invention according a second aspect thereof is characterized in that the swing arm is recessed at its portion adjacent to the reservoir tank toward a center of a vehicle body, and the reservoir tank is disposed closer to the center of the vehicle body than the rear master cylinder.

EFFECTS OF THE INVENTION

According to the first aspect of the present invention, the reservoir tank is sandwiched between the pivot frame (at a front side thereof) and the rear master cylinder (at a rear side thereof), thereby making it possible to efficiently suppress an influence of disturbance to the reservoir tank during vehicle operation. Moreover, due to such arrangement, it is possible to effectively use a space between the pivot frame and the rear master cylinder, and dispose the reservoir tank close to a center of the vehicle body to thereby contribute to mass centralization of the vehicle.

According to the second aspect of the present invention, it is possible to further control an influence of disturbance on the reservoir tank, and to reduce a vehicle width around the rear master cylinder, and to reduce a vehicle width around a step of the vehicle disposed in the vicinity of the rear master cylinder. Accordingly, a slimmer vehicle body can be obtained.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

The following is a description of an exemplary embodiment of the present invention with reference to the accompanying drawings. It should be noted that front, rear, right and left directions are the same as those in relation to the vehicle, unless a different particular description is given. Additionally, in the accompanying drawings, an arrow FR indicates a vehicular front direction, an arrow LH indicates a vehicular left direction, and an arrow UP indicates a vehicular upper direction.

Figure 1:
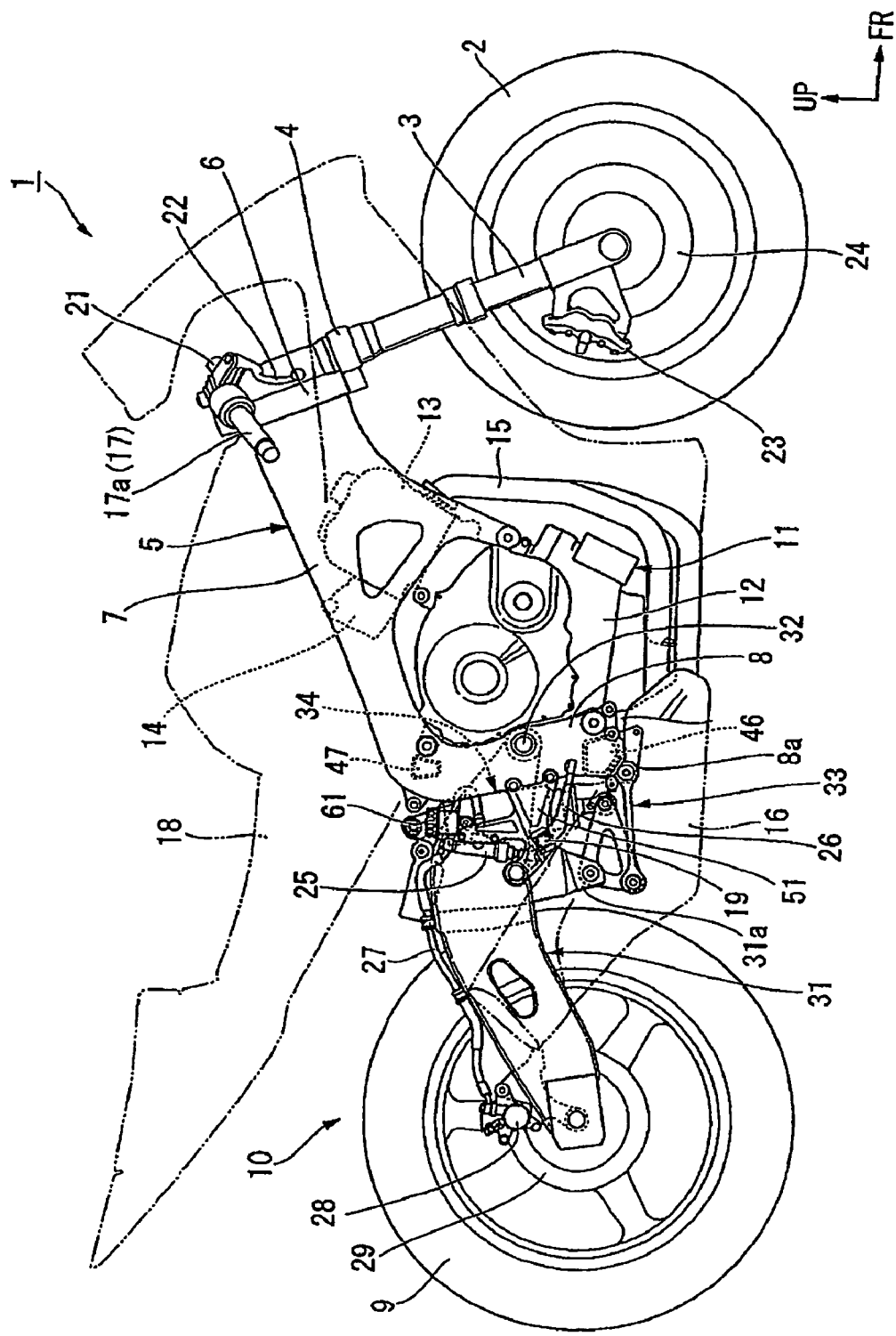
FIG. 1 is a right side view of a motorcycle according to an illustrative embodiment of the present invention.

As shown in FIG. 1, a motorcycle 1 (saddle-riding type vehicle) according to a selected illustrative embodiment of the present invention includes a vehicle body frame 5, with front and rear wheels 2, 9 operatively attached thereto. The motorcycle 1 includes right and left front forks 3, which rotatably support the front wheel 2 thereon. Upper parts of the front forks 3 are pivotally supported by a head pipe 6, located on a front end of the vehicle body frame 5, through a steering stem 4.

Right and left main frames 7 extend obliquely downwardly and rearwardly from the head pipe 6. Rear end portions of the main frames 7 are respectively integrally connected to upper ends of corresponding right and left pivot frames 8. The motorcycle 1 is also provided with a rear suspension 10 including a swing arm 31, for reciprocally suspending the rear wheel 9 on the right and left pivot frames 8.

An engine 11, which is a motor of the motorcycle 1, is disposed inside the vehicle body frame 5. The engine 11 is an in-line, transversely mounted four-cylinder engine with, for example, a crank axis extending along a vehicle width direction (i.e., in right and left directions of the vehicle). The engine 11 is disposed such that a cylinder 13 thereof (only one cylinder is visible in FIG. 1) is arranged on a crankcase 12 extending upwardly in a substantially vertical (standing) direction. An output torque from the engine 11 is transmitted from a rear left side of the crankcase 12 to the rear wheel 9 through, for example, a chain-drive transmission mechanism.

A throttle body 14 corresponding to each cylinder is connected to a rear portion of the cylinder 13. Exhaust pipes 15 corresponding to each cylinder are connected to a front portion of the cylinder 13. All the exhaust pipes 15 are routed under the crankcase 12, while being bent accordingly, and are connected to a front end of a muffler 16 disposed at a lower portion of a vehicle body. The muffler 16 extends rearwardly from a lower portion of the crankcase 12, and then extends obliquely rearwardly and upwardly to open an exhaust port at a front portion of the rear wheel 9.

A steering handlebar 17 is attached to upper ends of the right and left front forks 3 via the steering stem 4. An operator's seat 18 is disposed at obliquely rearwardly upward portions of right and left pivot frames 8. Right and left foot support members (steps) 19 are disposed at the back of the right and left pivot frames 8, respectively. An operator takes a riding posture such that he/she rides over the vehicle body to seat on the seat 18, mounts his/her right and left feet on the right and left steps 19, respectively, and places his/her right and left hands on right and left grips 17a of handlebar 17, respectively.

A front master cylinder 21, which is a hydraulic pressure generating source for a front wheel braking device, is operatively connected to a right grip 17a of the handlebar 17. A brake lever 22 for operating the front master cylinder 21 is disposed in a front portion of the right grip 17a.

When the operator places his/her hand on the right grip 17a, and operates the brake lever 22, by pressing same towards to the right grip 17a, hydraulic pressure is generated in the front master cylinder 21. Such a generated hydraulic pressure in the front master cylinder is transmitted though a brake hose or the like (not shown) to right and left front brake calipers 23, which are respectively supported by lower ends of the right and left front forks 3. Then the right and left front brake calipers 23 apply pressure to, and respectively sandwich right and left front brake rotors 24 therein, thereby braking (interrupting) rotation of the rotors 24. The right and left front brake rotors 24 are respectively supported on the forks 3 at the sides of the front wheel 2.

A rear master cylinder 25, which is a hydraulic pressure-generating mechanism of a rear wheel braking device, is disposed in a vicinity of the right step 19. A brake pedal 26 for operating the rear master cylinder 25 is disposed in front of the right step 19. When the operator depresses the brake pedal 26 with a heel portion of his/her foot simultaneously placed on the right step 19, hydraulic pressure is generated in the rear master cylinder 25.

Such a generated hydraulic pressure in the rear master cylinder is transmitted through a brake hose 27 or the like to a rear brake caliper 28, supported by a rear-end right side portion of the swing arm 31. The rear brake caliper 28 applies pressure and sandwiches a rear brake rotor 29 therein, where the rear brake rotor is supported at a right side of a rear wheel 9, thereby to brake its rotation.

The motorcycle 1 includes a swing arm-type rear wheel suspension 10, including the swing arm 31 rotatably supporting the rear wheel 9 at a rear end portion thereof. The swing arm 31 is vertically swingably attached to upper and lower intermediate portions of each of the right and left pivot frames 8 via a pivot shaft 32 extending therebetween in a vehicle width direction. The right and left pivot frames 8 extend vertically, and support the pivot shaft 32 passing therethrough along the vehicle width direction.

A link mechanism 33 is positioned to lie astride an arm lower support portion 31a, formed at a lower portion of the swing arm 31, and a lower frame support portion 8a formed at lower ends of the right and left pivot frames 8. The lower frame support portion 8a is disposed at a position below the pivot shaft 32.

The swing arm 31 and the link mechanism 33 are operated to thereby expand and contract a rear shock absorber 34, disposed between a base end side of the swing arm 31 and an upper portion of vehicle body frame, so as to absorb and dampen a reaction force from the rear wheel 9 impacting against a road surface during operation of the vehicle.

Figure 2:
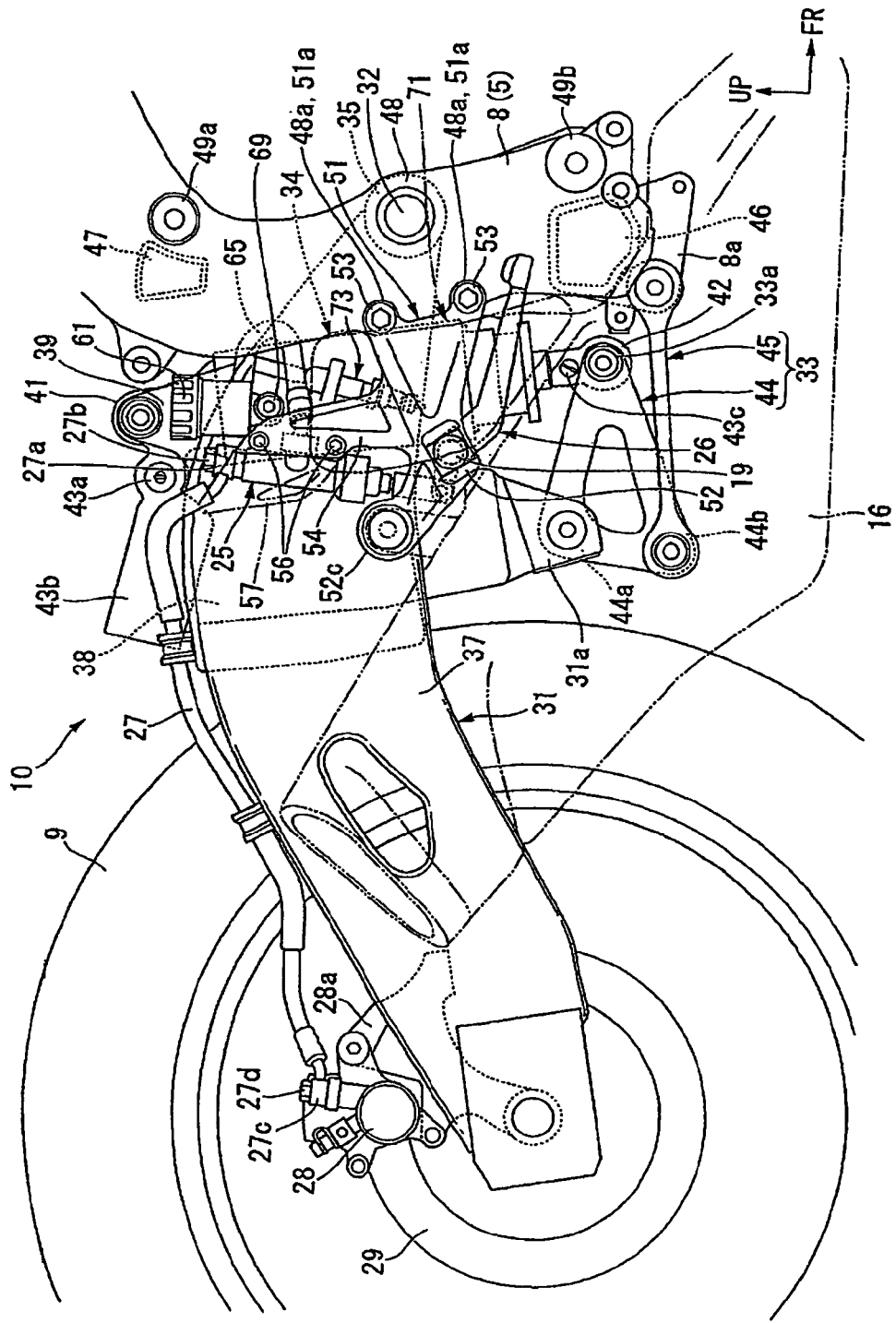
FIG. 2 is a right side view of a swing arm type rear suspension arrangement of the motorcycle of FIG. 1.
Figure 3:
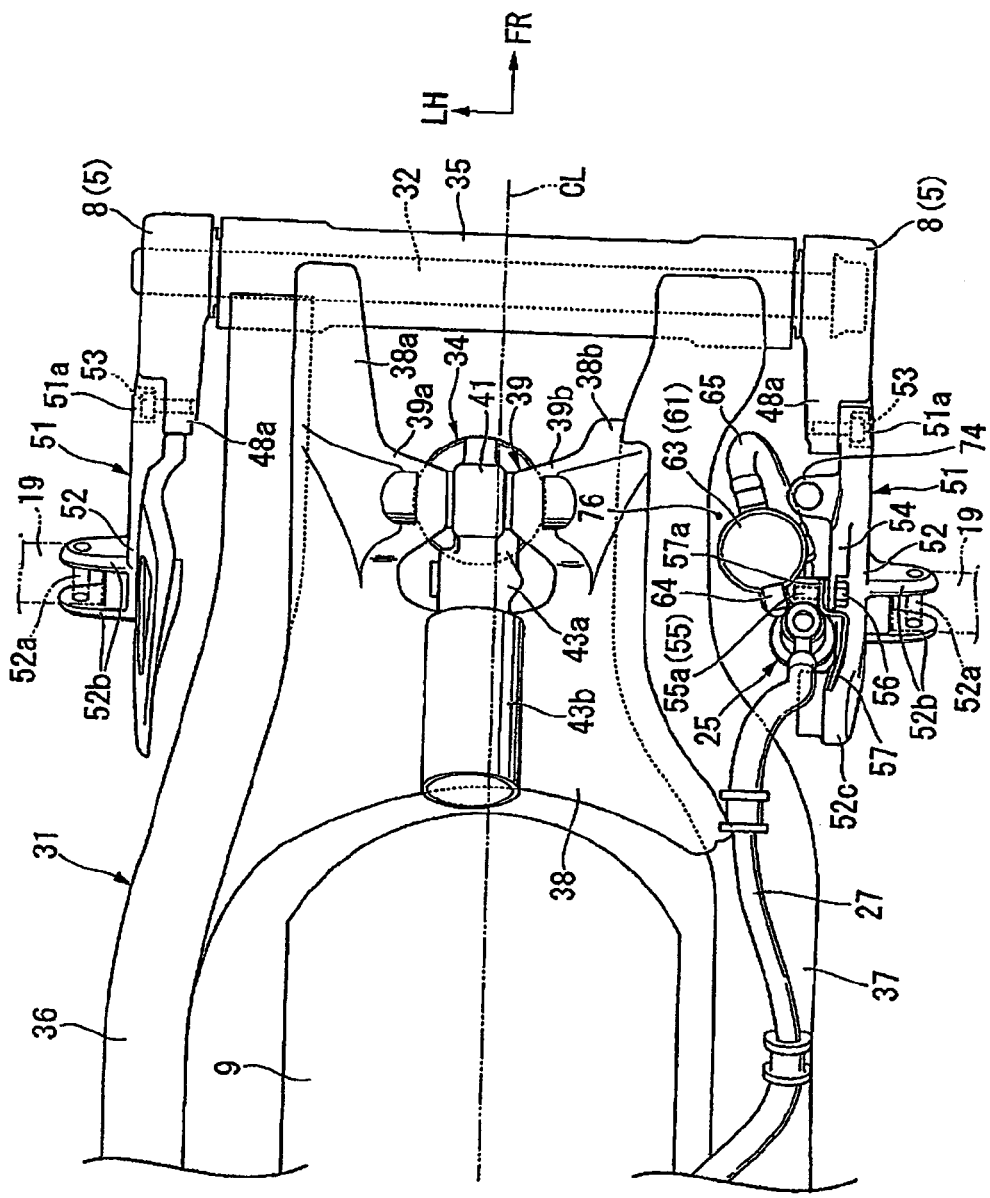
FIG. 3 is a top view of the swing arm type rear suspension arrangement of FIG. 2

As shown in FIGS. 2 and 3, the swing arm 31 includes a hollow pivot pipe 35 (extending in a vehicle width direction), right and left arm members 36, 37, and a cross member 38. The pivot pipe 35 has the pivot shaft 32 inserted therein. That is, the pivot shaft 32 pivotally supports the pivot pipe of the swing arm 31 thereon.

The right and left arms 36, 37 of the swing arm 31, extending in the front and rear direction, are connected to right and left end rear sides of the pivot pipe 35 at their front ends, respectively. The cross member 38 is disposed between the pivot pipe 35 and the rear wheel 9, and forms a connection between the right and left arms 36 and 37 at front portion thereof in a rear portion of the pivot pipe 35.

The right and left arms 36 and 37 of the swing arm 31 have substantially longitudinally rectangular cross sections, and are disposed to extend in a front and rear direction. The cross member 38 has a substantially rectangular cross section and extends a right and left direction. The pivot pipe 35, the right and left arms 36 and 37, and the cross member 38 are integrally joined together by welding or the like.

When viewed in a side view, the right arm 37 of the swing arm 31 is convex-down curved upwardly shaped member, i.e., the right arm is a gull-wing shaped member. A curvature top portion of the right arm 37 is positioned between the pivot frame 8 and a front end of the rear wheel 9. A right end of the cross member 38 is jointed to an inner side of the curvature top portion in a vehicle width direction.

Since the rear wheel 9 is disposed between rear portions of the right and left arms 36 and 37, the right and left arms 36 and 37 are formed so that a mutual distance between rear portions thereof is wider than a distance between front portions thereof at a pivot pipe 35 side portion. It may be noted that the right and left arms 36 and 37 are asymmetrically formed in view of arrangements of peripheral components such as an engine exhaust system, a drive chain, and the like.

As shown FIG. 3, the cross member 38 is formed such that, at its front portion along an outer shape of the rear wheel 9 in a plane view (top view), a rear portion thereof is shaped in a convex arc to relieve stress concentration at a joint portions between the cross member and each of the right and left arms 36 and 37 while avoiding contact thereof with the rear wheel 9. Moreover, the cross member 38 forms right and left extending members 38a and 38b, each extending forwardly, on the front sides of the right and left ends of the cross member 38.

The left extending member 38a extends forward more largely than the right extending member 38b to abut against the pivot pipe 35, thereby improving rigidity against reaction from the chain type transmission mechanism. Right and left mounting portions 39a and 39b are integrally formed above the right and left parts 38a and 38b of the cross member 38.

The right and left mounting portions 39a and 39b form an upper mount 39 for supporting an upper end of the rear shock absorber 34.

As shown in FIG. 2, the rear shock absorber 34 mainly includes a rod-type damper and a coil spring wound around the damper. The rear shock absorber 34 extends substantially vertically from a base end side of the swing arm 31. An upper end of the rear shock absorber 34 serves as an upper connecting portion 41 to the upper mount 39 and a lower end of the rear shock absorber 34 serves as a lower connecting portion 42 to a rear shock absorber support portion 33a of the link mechanism 33.

An upper adjuster 43a, that adjusts damping force on an expanding side of the rear shock absorber 34, is connected at the rear of the upper end (upper connecting portion 41) of the rear shock absorber 34. A sub tank 43b that fills hydraulic fluid, compressed gas or the like in the damper is connected at the rear of the upper adjuster 43a. The sub tank 43b has a cylindrical outer appearance and projects obliquely rearwardly upwardly from the upper end of the rear shock absorber 34. Additionally, for example, a lower adjuster 43c that adjusts damping force on a contracting side of the rear shock absorber 34 is disposed in the vicinity of the lower connecting portion 42.

The link mechanism 33 includes a first link 44 and a second link 45 connected to the first link 44. The first link 44 is swingably pivoted on the arm lower support portion 31a of the swing arm 31 through a connecting shaft along a vehicle width direction. The second link 45 is swingably pivoted on the lower frame support portion 8a of the pivot frame 8 through the connecting shaft along a vehicle width direction. In addition, the lower frame support portion 8a is disposed at an intermediate portion of a lower cross member 46 lying astride the lower ends of right and left pivot frames 8.

When viewed in a side view, the first link 44 has a substantially triangular shape. Each of corners portions of the first link serve as a connecting portion 33a, 44a, 44b with the other components of the rear suspension arrangement 10.

A first connecting portion 44a, which is positioned on a rear upper side of the first link 44, is connected to the arm lower support portion 31a positioned rearward of the rear shock absorber 34, through the connecting shaft along a vehicle width direction. A rear shock absorber support portion 33a positioned at the front end of the first link 44, is connected to the lower connecting portion 42 of the rear shock absorber 34 through the connecting shaft along a vehicle width direction.

A second connecting portion 44b is positioned on a rear lower side of the first link 44. A rear end of a rod-shaped second link 45, extending in the front and rear direction, is swingably connected to a second connecting portion 44b through the connecting shaft along a vehicle width direction. A front end of the second link 45 is connected to the lower frame support portion 8a below the pivot frame 8 through a connecting shaft along a vehicle width direction.

When the swing arm 31 swings about the pivot shaft 32 with respect to the vehicle body frame 5 so as to move an axle of the rear wheel 9 up and down, the first link 44 connected to the vehicle body through the second link 45, swings with respect to the swing arm 31 so as to move the rear shock absorber support portion 33a up and down.

As a result, the rear shock absorber 34 expands and contracts in accordance with swinging of the swing arm 31 so that the impact and the oscillation from the road surface are converted to expansion and contraction energy of the coil spring. At the same time, the energy is thus damped by the expansion and contraction and then smoothly absorbed.

Furthermore, in the swing arm type rear suspension arrangement 10 of the present invention, the rear shock absorber 34 at upper portion thereof is not supported by any of the vehicle body frame portions other than being indirectly supported by the pivot shaft 32 of the vehicle frame 5. The rear shock absorber 34 at upper portion thereof is supported by the upper mount 39 formed on the cross member 38 of the swing arm 31. Therefore, a cushion load caused at the time of swing arm actuation is not inputted onto any of the portions other than the pivot shaft 32 of the vehicle frame 5 so that an influence upon vehicle body behavior at the swing arm actuation time can be reduced.

Accordingly, an upper cross member 47, which is positioned at a higher position that a position of the pivot shaft 32 of the vehicle frame 5 does not required, being strong enough to receive the cushion/shock load so the excessive rigidity of the relevant portion is not needed. This makes it possible to achieve an increase of freedom in rigid design of the entire vehicle body frame 5, a reduction in weight, and an increase of freedom in layout of other parts by miniaturizing the upper cross member 47.

As shown in FIGS. 1 and 2, the right and left pivot frames 8 are consecutively formed so as to be curved downwardly from the rear ends of right and left main frames 7, respectively. Moreover, the right and left frames 8 extend downwardly from the rear ends of the right and left main frames 7 substantially along a vertical direction. The right and left frames 8 may specifically be slightly inclined such that the lower sides thereof come closer at front sides, respectively.

Pivot support portions 48, which support right and left ends of the pivot shaft 32, respectively, are disposed on the front sides of upper and lower intermediate portions of the right and left pivot frames 8. Upper mounting portions 49a, that support an upper side of the rear end of the crankcase 12 of the engine 11, are disposed on the front sides of upper ends of the right and left pivot frames 8 (inner peripheral side of the curved portion between the main frame 7 and the main frame 8). Lower mounting portions 49b, that support a lower side of the rear end of the crankcase 12 of the engine 11, are disposed on the front sides of lower ends of the right and left pivot frames 8.

Upper and lower step support portions 48a, that support upper and lower portions of the front ends of right and left step brackets 51, respectively, are disposed on the rear sides of upper and lower intermediate portions of the right and left pivot frames 8 (rear portion of the pivot support portion 48). The upper and lower step support portions 48a extend rearwardly from rear edges of the right and left pivot frames 8 to form a seat surface, which is circular in a side view, on the rear edge portions.

The right and left step brackets 51 are formed in a triangular shape, when viewed in a side view, projecting rearwardly from the front edges along the rear edges of the right and left pivot frames 8, respectively. The step main body support portions 52, which project obliquely rearwardly and downwardly, are disposed on the rear ends (projection top portions), respectively.

On the other hand, upper and lower bracket fixing portions 51a are disposed on upper and lower portions of the front ends of the right and left step brackets 51, respectively. The upper and lower bracket fixing portions 51a, each having a circular shape in a side view, expands forwardly from the front edge thereof.

As shown in FIGS. 2 and 3, as to the right and left step brackets 51, inner surfaces (also referred as a vehicle body inner side) of the upper and lower bracket fixing portions 51a in a vehicle width direction abut against outer surfaces (also referred as a vehicle body outer side) of the upper and lower step support portions 48a in a vehicle width direction, respectively. Bolts 53, which are along a vehicle width direction, are inserted in respective bracket fixing portions from the vehicle body outer side. Distal ends of the bolts 53 are screwed and clamped into respective screw holes of the upper and lower step support portions 48a so as to fix to the right and left pivot frames 8, respectively.

The upper and lower step support portions 48a displace the seat surface to the vehicle body inner side, so that the surfaces of the upper and lower bracket fixing portions 51a on the vehicle body outer side are substantially flush with the surfaces of pivot frames 8 on the vehicle body outer side, respectively.

Figure 4:
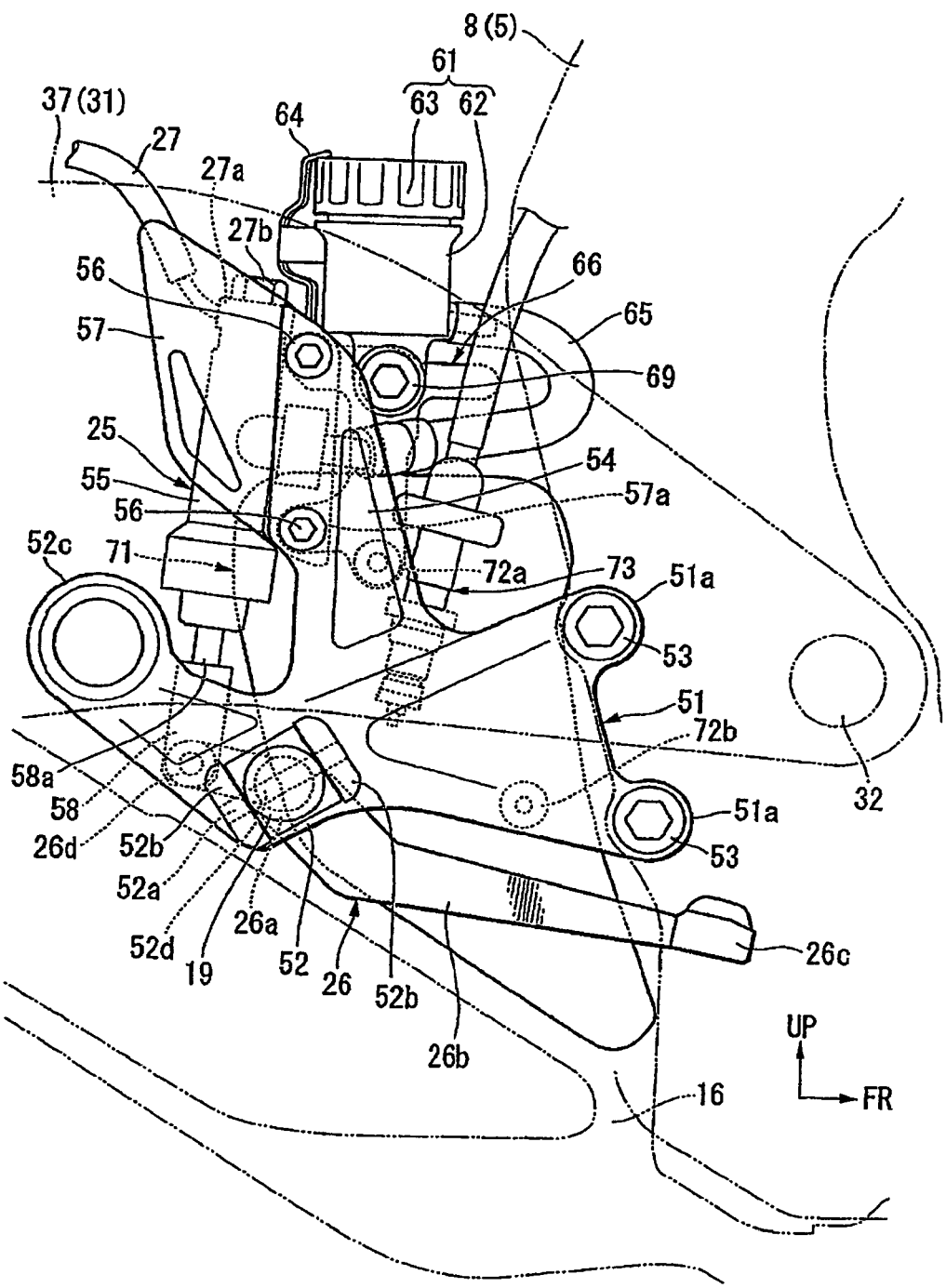
FIG. 4 is a right side view around a right step of the motorcycle of FIG. 1.

As shown in FIGS. 3 and 4, a pair of support walls 52b is disposed, in a substantially vertical direction (standing condition), on the vehicle body outer side of the step main body support portions 52 of the right and left step brackets 51. Each of support walls 52b is parallel to each other so as to support the base end of each of the right and left steps 19 through each connecting shaft 52a inclined rearwardly. The right and left steps 19 are rod-shaped and project substantially horizontally from the right and left step main body support portions 52 to the vehicle body outer side, respectively. The right and left steps 19 are swingably supported on the respective step main body support portions 52. The right and left steps 19 are movable upwardly (i.e., a distal end of each of the right and left step is moved upwardly). Additionally, a muffler support portion 52c that supports an upper portion of the muffler 16 is disposed on an obliquely rearwardly and upwardly extending portion of the step main body support portion 52 of the right step bracket 51.

A cylinder support portion 54, which supports the rear master cylinder 25 or the like, is disposed on an upper portion of the right step bracket 51, projecting upwardly. The cylinder support portion 54 forms a narrow triangular shape in a front and rear direction in a side view. A rear edge portion of the cylinder support portion 54 is disposed obliquely upwardly and rearwardly thereby ensuring a predetermined width in the front and rear direction on an upper rear side portion, and formation of upper and lower bolt through holes on upper and lower locations of the relevant portion.

Figure 5:
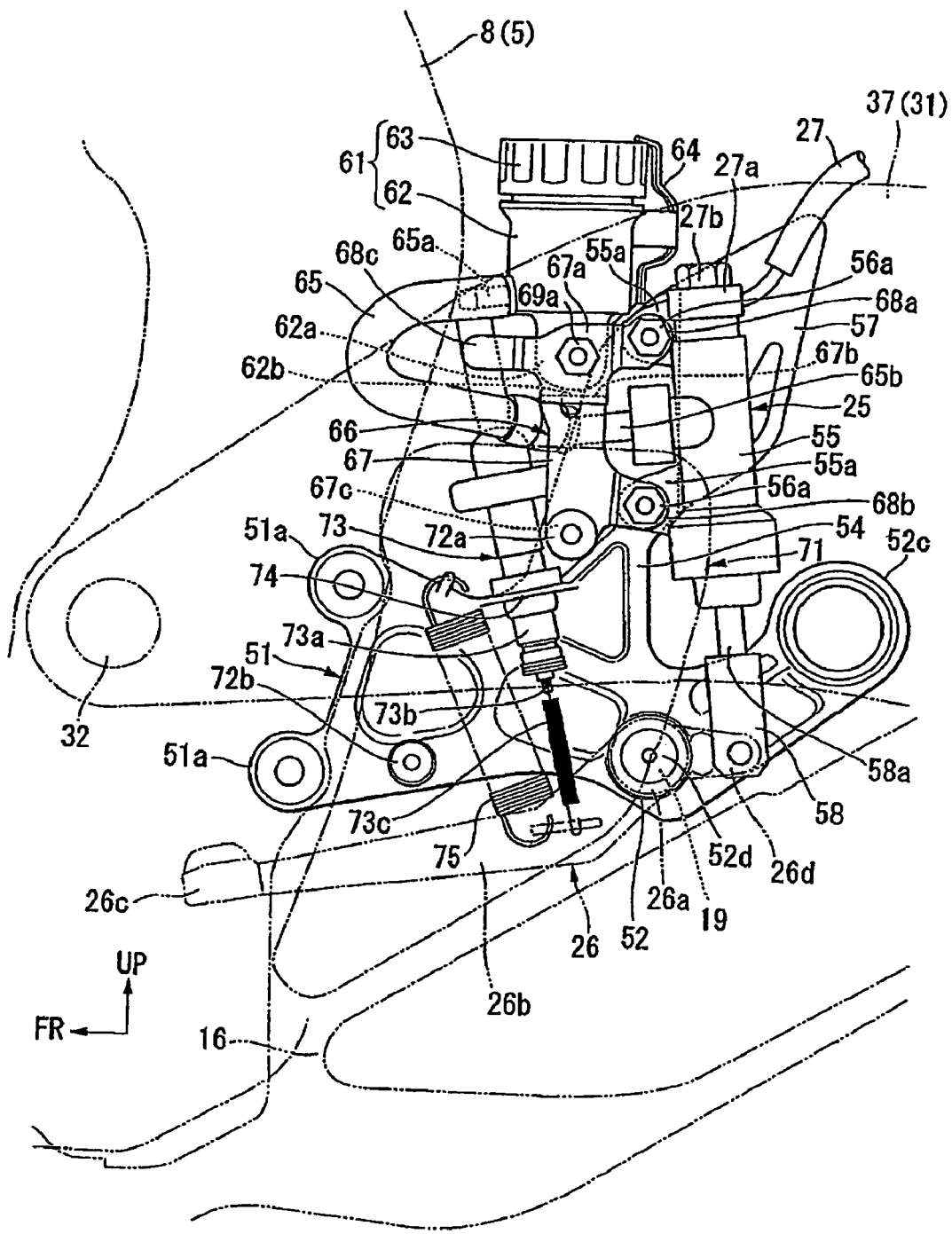
FIG. 5 is a left side view around a right step of the motorcycle of FIG. 1.

As shown in FIGS. 3 through 5, the rear master cylinder 25 has a cylindrical shape. The rear master cylinder 25 is disposed extending in a substantially vertical direction. In the depicted embodiment, the rear master cylinder 25 is specifically slightly inclined, and is positioned above the right step 19 and on the vehicle body inner side.

Upper and lower cylinder mounting bosses 55a are disposed on respective upper and lower portions of a cylinder main body 55 of the rear master cylinder 25, and are projected forwardly. The surfaces of the upper and lower cylinder mounting bosses 55a on the vehicle body outer side abut against the surface of the upper rear side of the cylinder support portion 54 on the vehicle body inner side.

In order to attach the cylinder main body 55 of the rear master cylinder 25 to the cylinder support portion 54, bolts 56 are inserted therein along a vehicle width direction from the vehicle body outer side, and corresponding nuts 56a are screwed and clamped on to distal ends of the bolts 56 from the vehicle body inner side. Additionally, spot facing portions are formed on the vehicle body outer side of the upper and lower bolt through holes of the cylinder support portion 54.

A guard plate 57, which covers the cylinder main body 55 of the rear master cylinder 25 from the vehicle body outer side, is formed at the upper rear portion of the cylinder support portion 54. The guard plate 57 has a substantially parallelogram shape, when viewed in a side view, extending obliquely, rearwardly and upwardly from the upper rear edge of the cylinder support portion 54.

The guard plate 57 causes the surface thereof on the vehicle body outer side to be positioned at a location slightly closer to the vehicle body outer side than the surface of the cylinder support portion 54 on the vehicle body outer side. The surface of the guard plate 57 on the vehicle body outer side is substantially flush with an end surface of a head portion of each bolt 56, which fix the rear master cylinder 25 to the cylinder support portion 54 on the vehicle body outer side.

A flange portion 57a, which extends forwardly after being displaced to the vehicle body inner side from the front edge, is disposed in front of the guard plate 57. The flange portion 57a is sandwiched between the upper rear side of the cylinder support portion 54 and each of the upper and lower cylinder mounting bosses 55a of the rear master cylinder 25. The bolts 56 and nuts 56a are clamped thereby fixing the guard plate 57 to the cylinder support portion 54 together with the rear master cylinder 25.

A push rod 58a of a push bracket 58 is disposed on a lower side of the rear master cylinder 25, projecting downward. The push rod 58a is operable to push a master piston in the cylinder body 55. The push bracket 58 is disposed on a distal end of the push rod 58a. The push bracket 58 is operable to connect a working end 26d of a brake pedal 26. The push bracket 58 is positioned just at the rear of the right step 19 of the right step bracket 51 on the vehicle body inner side, and the working end 26d on the rear end side of the brake pedal 26 is swingably connected to the push bracket 58 through the connecting shaft along a vehicle width direction.

As to the brake pedal 26, a base end 26a positioned at the rear side thereof is swingably supported at the step main body support portion 52 of the right step bracket 51 on the vehicle body inner side through a support shaft 52d, along a vehicle width direction. The support shaft 52d of the brake pedal 26 is disposed substantially coaxially with the right step 19. In an embodiment of the present invention, the support shaft 52d of the brake pedal 26 and the right step 19 may be disposed on different axes from each other.

A pedal arm 26b extends forwardly from the base end 26a of the brake pedal 26. A working end 26d is disposed projecting rearwardly from the base end of the brake pedal 26. The pedal arm 26b extends forwardly while displacing the lower portion of the right step bracket 51 towards the vehicle body outer side. A pedal portion 26c is disposed on its distal end, and is projected towards the vehicle body outer side.

An extension length of the pedal arm 26b is sufficiently large projection of the working end 26d the brake pedal 26. When the operator depresses the pedal portion 26c with his/her foot placed on the right step 19, the force is increased at a predetermined leverage ratio to be transmitted to the working end 26d, and the working end 26d pushes up the push bracket 58 and the push rod 58a to generate hydraulic pressure in the rear master cylinder 25.

A banjo adaptor 27a, arranged on the front end side of the brake hose 27, is fixed to the upper end of the rear master cylinder 25 using a banjo bolt 27b. As shown in FIG. 2, the brake hose 27 is routed over the right arm 37 of the swing arm 31. A banjo adaptor 27c on the rear end side is fixed to the upper end portion of the rear brake caliper 28. The rear brake caliper is supported by a rear end portion of the right arm 37 through a caliper bracket 28a, using a banjo bolt 27d. The hydraulic pressure generated in the rear master cylinder 25 is transmitted to the rear brake caliper 28 through the brake hose 27.

As shown in FIGS. 4 and 5, a reservoir tank 61 is disposed between the upper portion of the rear master cylinder 25 and the upper portion of the right pivot frame 8. The reservoir tank 61 reserves hydraulic fluid of a rear wheel braking device (brake fluid). The reservoir tank 61 is separated from the rear master cylinder 25. The reservoir tank 61 includes a bottomed cylindrical tank body 62 and a cap 63 covering the cylindrical tank body 62 at upper portion thereof.

The reservoir tank 61 is formed such that the cap 63 thereof is screwed into an opening in the upper portion of the bottomed cylindrical tank body 62. The cap 63 is made of plastic resin, which may be black. The bottomed cylindrical tank body 62 is made of a semi-transparent resin. The cap 63 is attachable to the bottomed cylindrical tank body 62, and is detachable therefrom. A lock member 64 is attached to the rear portion of the reservoir tank 61. The lock member 64 restricts detachment of the cap 63, which closes the opening in the upper portion of the tank body 62.

A hose joint 65a is disposed on a front side of a bottom portion of the reservoir tank 61 (tank body 62), and projected forwardly. One end of a communication hose 65 is attached to the hose joint 65a, and the other end of the communication hose 65 is attached to a hose joint 65b. The hose joint 65b is disposed in an extended manner on the front side of the upper and lower intermediate portion of the rear master cylinder 25 (cylinder body 55). Such arrangement of the hose joint 65b makes it possible to supply the hydraulic fluid in the reservoir tank 61 to the rear master cylinder 25.

The hose joint 65a of the reservoir tank 61 is positioned above and in front of the hose joint 65b of the rear master cylinder 25. The communication hose 65, which connects above hose joints 65a and 65b, is placed to be curved forward in a convex U shape or J shape.

As shown in FIGS. 1 through 3, a central position of the reservoir tank 61 is positioned closer to the vehicle body inner side in the vehicle width direction than a central position of the rear master cylinder 25 in the vehicle width direction.

An end of the reservoir tank 61 towards the vehicle body outer side is positioned closer to the vehicle body inner side than an end of the rear master cylinder 25 on the vehicle body outer side is positioned. Moreover, the lower portion of the reservoir tank 61 is flush with the upper end of the rear master cylinder 25, and the reservoir tank 61 and the rear master cylinder 25 are arranged to be close to each other in a longitudinal direction of the vehicle.

Figure 6:
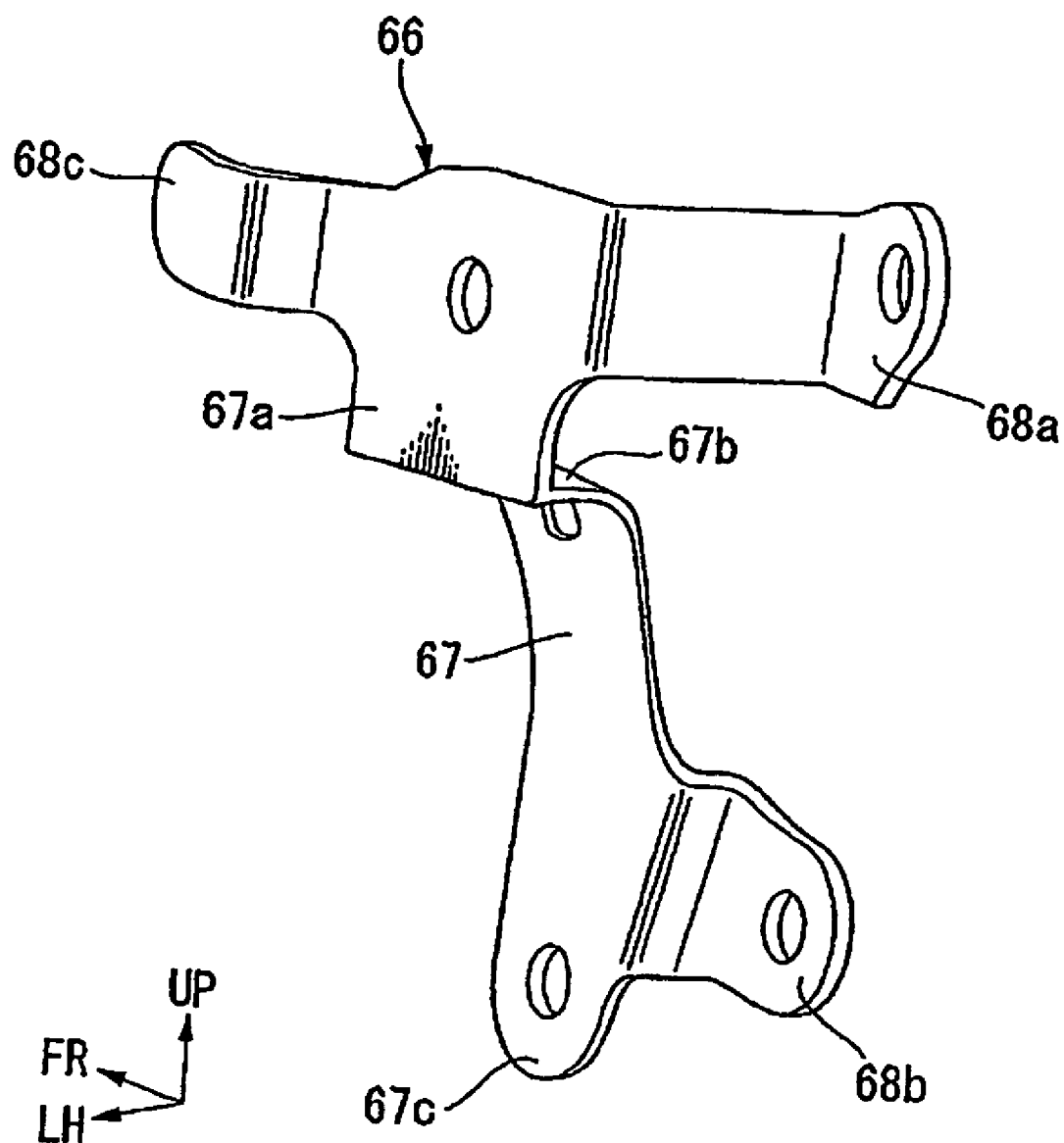
FIG. 6 is a perspective view of a support bracket that supports a reservoir tank for a rear master cylinder in the vicinity of the right step.

A tank fixing portion 62a, projected on a support bracket 66 fixed to the vehicle body inner side of the cylinder support portion 54, is disposed below the tank body 62 of the reservoir tank 61. As shown in FIGS. 5 and 6, the support bracket 66 is formed by appropriately bending a plate-like steel plate substantially perpendicular to the vehicle width direction.

The support bracket integrally includes a main body 67, which extends in a vertical direction of the cylinder support portion 54 on the vehicle body inner side. The support bracket further includes upper and lower leg members 68a and 68b extending to the rear of the main body 67. As to the main body 67, the upper side thereof is displaced towards the lower side on the vehicle body inner side. The upper side of the main body 67 forms a tank support portion 67a that supports the reservoir tank 61.

A surface of the tank fixing portion 62a on the vehicle body inner side abuts against a surface of the tank support portion 67a on the vehicle body outer side. In order to attach the reservoir tank 61 to the support bracket 66, a bolt 69 (see FIG. 4), adapted to fits in respective portions of the reservoir tank 61 and the support bracket 66 in vehicle width direction, is inserted therein from the vehicle body outer side, and a nut 69a is screwed and clamped into a distal end of the bolt 69 from the vehicle body inner side.

A rotation stop pin 62b is disposed in a substantially vertical direction below the tank fixing portion 62a. The rotation stop pin 62b is inserted into a substantially horizontal shelf portion 67b formed between upper-lower portions of the main body 67 of the support bracket 66.

When assembled, the upper and lower leg members 68a and 68b of the support bracket 66 extend rearwardly to the vehicle body outer side from the front edge of the main body 67. The upper and lower leg members 68a and 68b abut against upper and lower cylinder mounting bosses 55a of the rear master cylinder 25 from the vehicle body inner side, respectively. In order to attach the support bracket 66 to the cylinder support portion 54, the upper and lower leg members 68a and 68b are fastened to the cylinder support portion 54 using bolt 56 and the nut 56a.

In addition, the upper leg portion 68a of the support bracket 66 extending from the tank support portion 67a is disposed towards the vehicle body inner side. Therefore, an amount of displacement of the upper leg portion 68a from the vehicle body outer side is greater than an amount of displacement of the lower leg portion 68b (extending from the lower side of the main part 67) from the vehicle body outer side (see FIG. 6).

Moreover, in front of the tank support portion 67a of the support bracket 66, a projection member 68c is disposed projecting frontwardly for preventing of interference between the communication hose 65 and a harness of a rod-like brake switch 73.

As shown in FIGS. 4 and 5, a heat guard 71 is disposed on the vehicle body inner side of the right step bracket 51. The heat guard is made of a steel plate, and is adapted to suppress heat from the muffler 16. The heat guard 71 is disposed extending over the upper and lower portions of the right step bracket 51, when viewed in a side view. An upper intermediate portion of the front side of the heat guard 71 is elastically supported by the lower portion of the step bracket 51 on the vehicle body inner side through rubber bushes 72a. A front intermediate portion of the upper side of the heat guard 71 is elastically supported by the guard support portion 67c of the lower end of the main body 67 of the support bracket 66 through rubber bushes 72b.

The rod-like brake switch 73 is disposed on the vehicle body inner side of the step bracket 51. The rod-like brake switch 73 is disposed along a substantially vertical direction. In an embodiment, the rod-like brake switch 73 is slightly inclined frontwardly such that an upper portion thereof is disposed frontwardly. A pull rod 73b projects from the lower end of a switch main body 73a of the brake switch 73. The pull rod 73b is pulled downwardly against the switch main body 73a to energize the brake switch 73 to turn on a brake lamp of the vehicle rear portion.

When the pull rod 73b is engaged with the pedal arm 26b of the brake pedal 26 by a coil spring 73c and the brake pedal 26 is depressed, the brake switch 73 is energized to turn on the brake lamp. A ring-shape switch support portion 74 is disposed on the vehicle body inner side of the right step bracket 51. The switch main body 73a of the brake switch 73 is inserted through the ring-shape switch support portion 74. The ring-shape switch support portion 74 (FIG. 3) supports the switch main body 73a of the brake switch 73. A return coil spring 75 imparts an urging force to return the brake pedal 26 to a pre-depression state.

The rear master cylinder 25 and the reservoir tank 61 may be disposed integrally with the right step bracket 51 (including the step 19 and the brake pedal 26) through the support bracket 66. The rear master cylinder 25 and the reservoir tank 61 may be integrally attached and detached to and from the vehicle body. Further, the guard plate 57 and the heat guard 71 may be integrally attached and detached to and from the vehicle body.

As shown in FIG. 3, a curved concave portion 76 is formed on the right side of the front portion of the swing arm 31. The curved concave portion 76 is formed by curing a front portion of the right arm 37 towards the vehicle body inner side in order to swerve from the rear master cylinder 25 and the reservoir tank 61 positioned on the vehicle body outer side.

The rear master cylinder 25 and the reservoir tank 61 are arranged in the curved concave portion 76 of the swing arm 31 from the vehicle body outer side. Such arrangement of the rear master cylinder 25 and the reservoir tank 61 suppress the vehicle width around the right and left steps 19. Additionally, in view of formation of the curved concave portion 76 on the right side of the front portion of the swing arm 31, a laterally central position of the rear shock absorber 34 and that of the upper mount 39 are situated slightly more leftwardly than a longitudinal center line CL of the vehicle body.

As discussed above, according to an embodiment of the motorcycle 1 having the rear master cylinder 25 for providing a braking force at the rear of a pivot frame 8 supporting the swing arm 31 for rear wheel suspension arrangement, the reservoir tank 61 that supplies hydraulic fluid to the rear master cylinder 25 is disposed between the pivot frame 8 and the rear master cylinder 25.

According to such configuration—i.e., the reservoir tank 61 is sandwiched between the pivot frame 8 and the rear master cylinder 25 at front and rear portion thereof, respectively—it is possible to efficiently suppress an influence of disturbance to the reservoir tank 61. Moreover, it is possible to effectively use a space between the pivot frame 8 and the rear master cylinder 25, and to dispose the reservoir tank 61 closer to the center of the vehicle thereby contributing to a mass centralization of the vehicle body.

Further, as compared with the use of the dedicated rear master cylinder 25 having the reservoir tank 61 integrally formed therein, a conventional reservoir tank 61 of a separate type may be used, and the length of the communication hose 65 can be shortened by placing the reservoir tank 61 close to the rear master cylinder 25. Accordingly, it is possible to reduce the manufacturing cost of the motorcycle 1.

Furthermore, since the reservoir tank 61 is supported between the rear master cylinder 25 and the pivot frame 8, it possible to improve maintainability of other parts, such as the rear shock absorber 34 and the like, positioned on the vehicle body inner side.

Moreover, according to the illustrated embodiment of motorcycle 1, as discussed above, a portion adjacent to the reservoir tank 61 in the swing arm 31 is recessed to the vehicle body inner side, and the reservoir tank 61 is situated closer to the vehicle body inner side than the rear master cylinder 25. Therefore, during operation of the vehicle, it is possible to further control an influence of disturbance on the reservoir tank 61, and to suppress the vehicle width around the rear master cylinder 25. It is also possible to suppress the vehicle width around the step 19 in the vicinity of the rear master cylinder 25, thereby obtaining the slimmer vehicle body.

In addition, the present invention is not limited to the aforementioned embodiment, for example, the rear master cylinder 25 is not limited to one that is dedicated to the rear brake, and it may be possible to use the one for a hydraulic generating source in a front and rear wheel interlocking brake. Also, the support bracket 66 may be formed to be integral with the guard plate 57 instead of the one formed separately therefrom.

Moreover, a configuration may be used in which a pivot support portion and a link mechanism attaching portion are disposed on the rear end of the crankcase 12 of the engine 11 and the swing arm 31 and the link mechanism 33 are attached thereto. A configuration may be also used in which the swing arm 31 and the link mechanism 33 are attached to at least one of the pivot frame 8 and the engine 11. Furthermore, a configuration may be used in which the pivot frame 8 and the main frame 7 are separately formed.

Still further, the swing arm 31 is not limited to a both-end support type that supports the rear wheel 9 by the pair of right and left arms 36 and 37. It is possible to use a cantilever type swing arm, that supports the rear wheel 9 by only one of the right or left arms.

The configuration of the aforementioned embodiment as described herein is one example of the present invention, and it will be understood that the present invention can be applied to a three-wheeled or four-wheeled vehicle in addition to a motorcycle, and also can be changed without departing from the scope and spirit of the present invention.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A saddle-riding type vehicle comprising: a pivot frame that supports a swing arm for a rear wheel suspension; a rear master cylinder disposed rearwardly of the pivot frame; and a reservoir tank for supplying a hydraulic fluid to the rear master cylinder, the reservoir tank being disposed between an upper portion of the pivot frame and an upper portion of the rear master cylinder.

2. The saddle-riding type vehicle having the rear master cylinder according to claim 1, wherein the swing arm is configured with a recess formed therein at a portion adjacent to the reservoir tank, the recess extending inwardly toward a center of a vehicle body;

and wherein the reservoir tank is disposed closer to a longitudinal center line of the vehicle body than the rear master cylinder.

3. The saddle-riding type vehicle having the rear master cylinder according to claim 1, wherein said reservoir tank is positioned closer to a longitudinal center line of a vehicle body than the rear master cylinder.

4. The saddle-riding type vehicle having the rear master cylinder according to claim 1, wherein said reservoir tank is separate from the rear master cylinder.

5. The saddle-riding type vehicle having the rear master cylinder according to claim 1, wherein a lower end portion of the reservoir tank is substantially flush with an upper end portion of the rear master cylinder.

6. The saddle-riding type vehicle having the rear master cylinder according to claim 1, wherein the vehicle comprises a vehicle body frame, and further comprising a support bracket attached to the vehicle body frame; and wherein said reservoir tank is supported on said support bracket.

7. The saddle-riding type vehicle having the rear master cylinder according to claim 1, wherein said reservoir tank includes a bottomed cylindrical tank body and a cap covering the cylindrical tank body at upper portion thereof.

8. The saddle-riding type vehicle having the rear master cylinder according to claim 7, wherein said bottomed cylindrical tank body is made of a semi-transparent resin, and said cap is made of black resin.

9. A saddle-riding type vehicle comprising
a swing arm having a first end portion and a second end portion; said second end portion rotatably supporting a rear wheel of said vehicle;
a pivot frame for pivotally supporting said first end portion of said swing arm;
a rear master cylinder arranged rearwardly of said pivot frame; and
a reservoir tank for supplying hydraulic fluid to the rear master cylinder;
wherein said swing arm is configured with a concave curved recess portion formed therein;
and wherein said reservoir tank is disposed in said concave curved recess portion of the swing arm between the pivot frame and the rear master cylinder.

10. A saddle-riding type vehicle according to claim 9, wherein the reservoir tank is positioned closer to a longitudinal center line of the vehicle than the rear master cylinder.

11. A saddle-riding type vehicle according to claim 9, wherein said swing arm includes a left arm portion and a right arm portion; and wherein said left arm portion and said right arm portion are asymmetrical to each other.

12. A saddle-riding type vehicle according to claim 9, wherein said concave curved recess portion is formed on said right arm portion of the swing arm.

13. A motorcycle comprising
a swing arm rotatably supporting a rear wheel of said motorcycle at a rear portion thereof;
a pivot frame for swingably supporting said swing arm at a front portion thereof;
a rear master cylinder arranged rearwardly of said pivot frame; and
a reservoir tank for supplying hydraulic fluid to the rear master cylinder;
wherein said swing arm is configured with a concave recess formed therein; and
wherein said reservoir tank is disposed in said concave recess of the swing arm between the pivot frame and the rear master cylinder.

14. A motorcycle according to claim 13, wherein said reservoir tank is positioned closer to a longitudinal center line of the vehicle than the rear master cylinder.

15. A motorcycle according to claim 13, wherein said reservoir tank is disposed between an upper portion of the rear master cylinder and an upper portion of the pivot frame.

16. A motorcycle according to claim 13, wherein said reservoir tank is separate from the rear master cylinder.

17. A motorcycle according to claim 13, further comprising a support bracket attached to a vehicle body frame; and wherein said reservoir tank is supported on said support bracket.

18. A motorcycle according to claim 13, wherein a lower end portion of the reservoir tank is substantially flush with an upper end portion the rear master cylinder.

* * * * *